United States Patent [19]

Perrin

[11] 4,054,063

[45] Oct. 18, 1977

[54] GUARD FOR A CHAIN AND CHAIN WHEEL TRANSMISSION IN PARTICULAR FOR THE TRANSMISSION OF A CYCLE OR THE LIKE

[75] Inventor: Marc Auguste Perrin, Genlis, France

[73] Assignee: Cycles Peugeot, Valentigney, France

[21] Appl. No.: 717,822

[22] Filed: Aug. 26, 1976

[30] Foreign Application Priority Data

Sept. 8, 1975 France .................................. 75.27441

[51] Int. Cl.² ............................................... F16P 1/00
[52] U.S. Cl. ..................................................... 74/611
[58] Field of Search ........................ 74/611, 608, 609

[56] References Cited

U.S. PATENT DOCUMENTS

| 3,641,840 | 2/1972 | Rössler et al. | 74/609 |
| 3,910,136 | 10/1975 | Juy | 74/611 |
| 3,939,730 | 2/1976 | DeHaan | 74/611 |

*Primary Examiner*—Edgar W. Geoghegan
*Attorney, Agent, or Firm*—Sughrue, Rothwell, Mion, Zinn and Macpeak

[57] ABSTRACT

The guard for a transmission including a chain and chain wheels comprises a fixed cover surrounding a first reach of the chain and a first of the chain wheels. A tube for surrounding and protecting a second reach of the chain is pivoted to the cover at a point corresponding to the point of tangency of the second reach of the chain with the first chain wheel.

8 Claims, 3 Drawing Figures

GUARD FOR A CHAIN AND CHAIN WHEEL TRANSMISSION IN PARTICULAR FOR THE TRANSMISSION OF A CYCLE OR THE LIKE

The present invention relates to a guard or protector for a chain and chain wheel transmission which is more particularly adapted for the transmissions employed on cycles for connecting the crank gear of the pedals to the rear wheel. It is well known that this type of transmission has serious drawbacks. There is indeed risk of soiling due to the presence of a lubricant on the chain and the chain wheel and a risk of catching in particular at the point of engagement of the chain with the chain wheel.

To overcome these drawbacks, a housing or a guard is usually mounted on the upper reach or portion of the chain and one of the chain wheels. Some guards also protect the lower reach or portion of the chain, but unfortunately they are heavy and incompatible with the light weight of modern bicycles.

The overall size of this guard is moreover still further increased when the transmission is equipped with a gear changer which shifts the lower reach of the chain in both a horizontal plane and vertical plane.

An object of the present invention is to overcome these drawbacks and to provide a guard which permits surrounding the moving portion of the chain, that is to say the lower reach, without rendering the assembly heavy.

According to the invention, there is provided a guard which comprises a fixed cover surrounding one of the reaches of the chain and at least one chain wheel and a protecting tube for the second reach of the chain which is pivoted to the cover at the point of tangency of the second reach with the chain wheel.

According to another feature of the invention, the tube is connected to the cover to pivot about two axes which are perpendicular to each other and perpendicular to the axis of the second reach of the chain.

The lower or movable reach of the chain is thus carefully surrounded so that no projection of oil or catching can occur. This reach is thus protected with the same efficiency as the chain reach which is fixed, that is to say, the upper reach of the chain. Moreover, the lower reach can move freely when it is shifted by the gear changer.

The ensuing description of an embodiment, which is given by way of example to which the invention is not intended to be limited, shows features and advantages of the invention.

Figure 1:
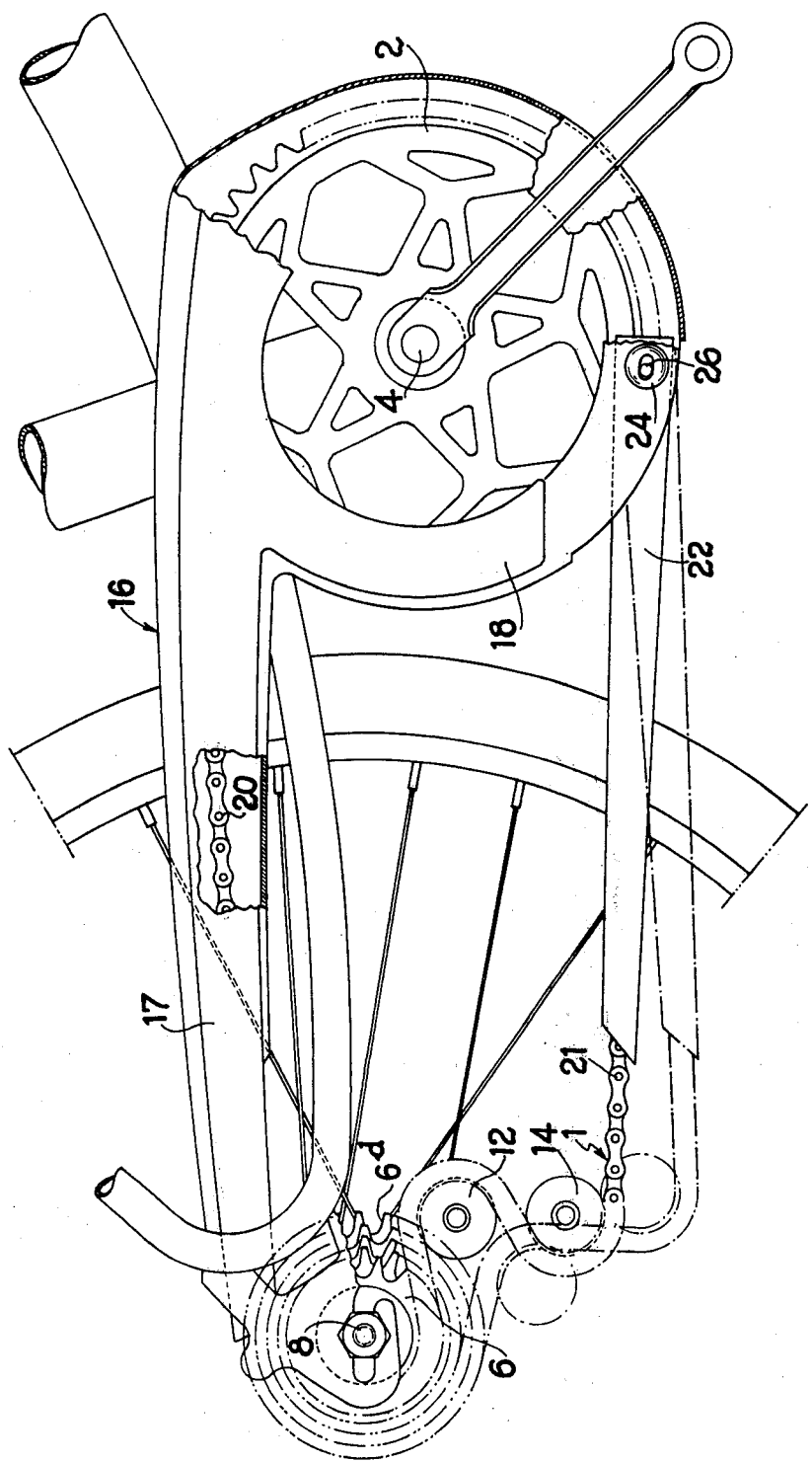
FIG. 1 is a side elevational view, with a part cut away, of a cycle transmission provided with a guard according to the invention.

The three Figures show a guard mounted on a chain and chain wheel transmission of a cycle provided with a gear changer, but it will be obvious that this is given merely by way of example and that the guard may be mounted on other chain and chain wheel transmissions whatever be the utilisation thereof.

The transmission shown in the drawings comprises in the usual manner a chain 1 which extends around a chain or sprocket wheel 2, mounted on the shaft 4 of the crank gear of the vehicle, and around a chain sprocket pinion 6 mounted on the spindle 8 of the rear wheel of the vehicle. In the illustrated embodiment, the cycle is provided with a speed changer and consequently the spindle 8 carries a number of sprocket pinions or wheels 6, $6^a$, $6^b$, $6^c$, $6^d$ and rollers 12, 14 for regulating the position and tension of the chain 1.

According to the invention, a guard 16 is mounted around the chain 1 and particularly around the upper reach 20 of the chain and around the chain wheel 2 and the lower reach 21 of the chain. This guard 16 has a fixed part or cover which forms an arm 17, extended by a ring 18 around the chain wheel 2, and a movable cover 22 which is pivoted to the ring 18 and surrounds the lower reach 21 of the chain. The fixed cover is formed by two side walls $16^a$, $16^b$ which are folded along their periphery and fixed to each other. Thus the arm 17 and the ring 18 are closed in their upper part and on the front edge of the ring 18. They are also closed in theirlower part, but an opening is formed at each of their ends, so that the arm 17 has a height which decreases from the ring 18 to the region of the sprocket wheel 6 and the reach 20 of the chain can move slightly within the arm 17 so as to pass from one chain sprocket pinion to the other.

At a point diametrally opposed to the arm 17, the ring 18 has two opposed bosses 24 each one of which has an aperture 26. The inner sides of the bosses 24 accommodate a sherical ball 28 integral with the cover 22. This cover 22 is constituted by a tube of substantially rectangular cross-sectional shape one end of which supports on two opposed walls thereof a boss of part-spherical outer shape provided with a stud or spigot 30 which cooperates with the aperture 26 so as to guide the tube 22 when it pivots about an axis passing through the two studs 30 and about a vertical axis. The tube 22 is provided with a slot 32 which divides it into two arms each of which arms passes on one side of the wheels 2. Each of these arms supports one of the bosses 28 and one of the studs 30.

Figure 3:
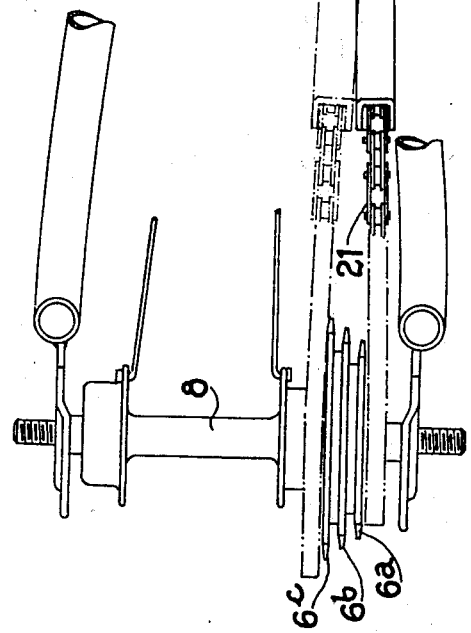
FIG. 3 is a vertical sectional view of the tube.

At the end thereof opposed to the ball joint 28, the tube 22 is provided internally with two ramps 34, 36 for guiding rollers 38 of the chain 1. The chain is thus always centred in the tube 22 irrespective of the position of the latter. Moreover, any lateral or vertical displacement of the chain also shifts the tube 22 (FIG. 3).

Figure 2:
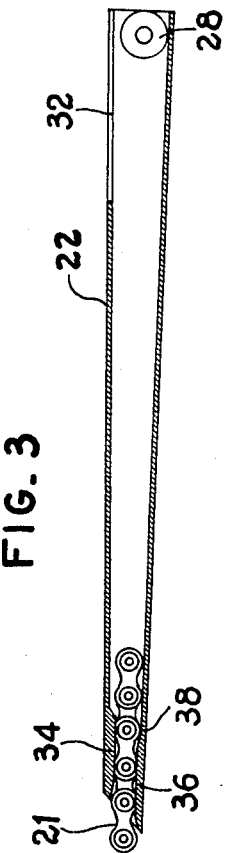
FIG. 2 is a plan view, with parts in section, of the protecting tube of the lower reach of the chain.

As can be seen clearly in FIGS. 1 and 2, when the gear changer shifts the chain 1 from sprocket pinion 6 to a pinion $6^a$, $6^b$ or other pinion, the lower reach 21 of the chain is shifted in both a horizontal plane and vertical plane. This movement also moves the tube 22 which can swivel owing to the cooperation of the ball 28 with the inner faces of the bosses 24. The studs 30 moving in the apertures 26 limit the amplitude of this swivelling and above all prevent the tube 22 from rotating about itself on a horizontal axis.

The overall size of the tube 22 is relatively small since it is sufficient that it surround the lower reach 21 of the chain and move therewith. It will be understood that the overall size of the arm 17 is much larger but not excessively large in height and can extend practically to the region of the chain sprocket pinion of the rear wheel.

The combination of this upper arm with the movable tube of the lower reach of the chain provides a real protection against any projection of a lubricant carried by the chain since the two reaches of the chain are completely surrounded by the tube and arm which protect them.

Moreover, there is no longer any danger of hooking or catching on the chain at the point of engagement of the chain with the chain wheel, since this point of engagement is enclosed in the region of the pivotal connection between the tube 22 and the ring 18. Preferably, moreover, the centre of the portion of the sphere defined by the inner faces of the bosses 24 and by the part-spherical bosses 28 exactly coincides with the point where the lower reach 21 of the chain leaves the chain wheel. The angle of the pivotal movement of the lower reach 21 of the chain can thus be relatively large and permits the use of any type of gear changer.

The guard, and in particular the tube 22, can be easily constructed of an inert material, such as polyamide, so as to avoid noise and breakage. Owing to its configuration, the assembly can be made extremely light and can be easily mounted on present-day light bicycles.

It will be understood that it may also be mounted on cycles and other devices without a gear changer, since the protection is effective, does not result in an increase in weight of the assembly, and avoids any premature wear of the chain, in particular owing to the presence of the ramps 36 and 34 in the tube 22.

Such a guard is in no way limited to the transmissions of bicycles and is adapted to various types of transmissions, including chains and chain wheels or sprockets, adapted to transmit a movement of rotation between a plurality of parallel shafts, such as those employed in motorized cycles, automobiles or in industry. Depending on the number of shafts to be connected, the guard has one or a plurality of fixed covers and one or a plurality of movable covers pivoted together in such manner as to permit the pivoting of each movable cover about two axes which are perpendicular to each other and to the general direction of the movable cover.

Having now described my invention what I claim as new and desire to secure by Letters Patent is:

1. A guard for a transmission including a chain and chain wheels, and in particular for the transmission of a cycle, which comprises a fixed cover for surrounding a first reach of the chain and surrounding at least one chain wheel, and a tube for surrounding and protecting a second reach of the chain, the tube being pivoted to the cover at a point corresponding to a point of tangency of the second reach of the chain with said one chain wheel.

2. A guard as claimed in claim 1, wherein the tube is pivotable about two axes perpendicular to each other and perpendicular to a longitudinal axis of the second reach of the chain.

3. A guard as claimed in claim 2, wherein the tube carries a ball joint ball and a wall of the fixed cover defines a part-spherical recess, said ball cooperating with said part-spherical recess.

4. A guard as claimed in claim 3, wherein the wall of the cover defining the part-spherical recess defines two apertures and two studs carried by said ball are movably mounted in said apertures.

5. A guard as claimed in claim 1, wherein an end of the tube remote from the pivotal connection thereof with the cover carries two inner ramps which are in facing relation and guide and centre rollers of the chain.

6. A guard as claimed in claim 1, wherein the fixed cover has two side walls which are curved and fixed to each other at the periphery of the side walls.

7. A guard as claimed in claim 1, wherein the fixed cover has an arm portion for enclosing the fixed reach of the chain and a ring portion for protecting said one chain wheel.

8. A guard as claimed in claim 1, wherein the tube is split at an end thereof adjacent said one chain wheel and defines two arms each of which arms carries a half-ball of a ball joint, the cover having two opposed spaced apart sidewalls which carry means pivotably engaging said half-balls.

* * * * *